US006943851B2

(12) United States Patent
Ozawa

(10) Patent No.: US 6,943,851 B2

(45) Date of Patent: Sep. 13, 2005

(54) LIQUID CRYSTAL DEVICE AND PROJECTION-TYPE DISPLAY DEVICE

(75) Inventor: Kinya Ozawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/663,816

(22) Filed: Sep. 17, 2003

(65) Prior Publication Data

US 2004/0119913 A1 Jun. 24, 2004

(30) Foreign Application Priority Data

Sep. 20, 2002 (JP) ....................................... 2002-275198

(51) Int. Cl.[7] .................... G02F 1/1335; G02F 1/13363

(52) U.S. Cl. ............................ 349/8; 349/98; 349/119; 349/130

(58) Field of Search ........................... 349/98, 115, 119, 349/177, 8, 160, 176, 178, 194, 117, 130; 353/31, 34

(56) References Cited

U.S. PATENT DOCUMENTS 4,073,571 A * 2/1978 Grinberg et al. ............ 349/194
6,016,178 A * 1/2000 Kataoka et al. ............. 349/117
2002/0093284 A1 * 7/2002 Adachi et al. .............. 313/506
2002/0159006 A1 * 10/2002 Miyatake et al. ............. 349/98
2003/0002151 A1 * 1/2003 Yano .......................... 359/443

FOREIGN PATENT DOCUMENTS

JP 2002-040428 A 6/2002

* cited by examiner

*Primary Examiner*—Robert H. Kim
*Assistant Examiner*—Tai Duong
(74) *Attorney, Agent, or Firm*—Oliff & Berridge, PLC

(57) ABSTRACT

The invention provides a liquid crystal device that can obtain a perfect black level display even if a liquid crystal device using circular polarization is employed as a light valve. The liquid crystal device can include, liquid crystal panels each for rotating light incident from a liquid crystal layer sealed between a pair of substrates facing each other, first polarizers each for converting incident light into a circularly polarized components in one rotary direction to emit to the liquid crystal panel, the first polarizer each facing the incidence surface of the relevant liquid crystal panels and having a birefringence characteristic based on the peak wavelength of the incident light, and second polarizers for transmitting the circularly polarized components in the other rotary direction of the light that passed through the liquid crystal panels, respectively, the second polarizers facing the exit surfaces of the liquid crystal panels and having birefringence characteristics based on the peak wavelengths of the incident lights.

5 Claims, 5 Drawing Sheets

LIQUID CRYSTAL DEVICE AND PROJECTION-TYPE DISPLAY DEVICE

BACKGROUND OF THE INVENTION

1. Field of Invention

The present invention relates to a liquid crystal device and a projection-type display device, which are suitable for homeotropic alignment.

2. Description of Related Art

A liquid crystal panel used as a liquid crystal light valve and the like is formed by sealing liquid crystal between two substrates, such as glass substrates and quartz substrates. In such a liquid crystal panel, active elements, such as thin film transistors (TFTs), and pixel electrodes connected to the active elements are arranged in a matrix on one of the substrates while a counter electrode is arranged on the other substrate. By changing the optical characteristic of the liquid crystal layer sealed between the two substrates in accordance with an image signal, the liquid crystal panel can perform a display.

In other words, the image signal can be supplied to the pixel electrodes (ITOs) arranged in a matrix by the TFT elements and the polarization state of light that passes through the pixel electrodes and the liquid crystal layer changes in accordance with the image signal. The polarization state of light that is transmitted through the liquid crystal layer changes according to the change of the arrangement of liquid crystal molecules by a voltage applied to the liquid crystal layer. A liquid crystal device is formed by arranging a polarizer on the incidence surface and the exit surface of the liquid crystal panel, respectively.

The liquid crystal device displays images in accordance with the polarization direction of light, which is caused by the polarizer, and the rotation direction of light that passes through the liquid crystal layer.

In a planer alignment where the direction of the liquid crystal molecules is set parallel to the substrate when a voltage is not applied to it, an alignment layer is formed on the surface that contacts the liquid crystal layer of one substrate (an active matrix substrate (referred to as an element substrate)) and the other substrate (a counter substrate), respectively, and subjected to a rubbing process.

Therefore, when a voltage is not applied to the liquid crystal molecules, they align in a rubbing direction. When the rubbing directions of the element substrate and the counter substrate are orthogonal to each other, the liquid crystal molecules are continuously changed their directions in the liquid crystal panel and arranged in directions different from each other by 90° between the both substrates. In this state, by providing polarizers with polarization axes orthogonal to each other on the incidence surface and the exit surface of the liquid crystal panel, respectively, to make the directions of the liquid crystal match the rubbing directions of the respective substrates, when a voltage is not applied, incident light can be rotated by 90° in accordance with the arrangement of the liquid crystal molecules in the liquid crystal layer to be emitted from a front surface of the liquid crystal panel through the polarizer. That is, in this case, a white display is performed when a voltage is not applied.

When a voltage is applied to liquid crystal, the arrangement direction of the liquid crystal changes and rotation of light in a vibration direction, which is caused by the liquid crystal in the liquid crystal panel, becomes limited. Therefore, light emitted from the front surface of the liquid crystal panel is absorbed by the polarizer. Light is transmitted in a transmittance ratio corresponding to the image signal by applying the voltage in accordance with the image signal to the liquid crystal, and thus images are displayed.

On the other hand, there is a case that a homeotropic alignment where, when voltage is not applied, the liquid crystal molecules are perpendicular to the substrates is adopted. According to the homeotropic alignment, in case where the polarization axes of the polarizers on the incidence plane of the liquid crystal panel and on the emission plane of the liquid crystal panel are orthogonal to each other, a black display is performed when voltage is not applied. The black display is performed by the two polarizers with the polarization axes orthogonal to each other. It is possible to obtain a perfect black level display in the homeotropic alignment.

However, in the liquid crystal device, deterioration of the liquid crystal, such as decomposition of a liquid crystal component, pollution by impurities generated in liquid crystal cells, and image persistanse of a displayed image occurs due to application of a direct current voltage to the liquid crystal. Therefore, in general, an inversion driving of inverting the polarity of the driving voltage of each pixel electrode at a predetermined cycle such as every frame or every field in the image signal is performed. Also, a line inversion driving method such as a 1H inversion driving method of inverting the polarity of the driving voltage in every row of the pixel electrodes at a predetermined cycle or a 1S inversion driving method of inverting the polarity of the driving voltage in every column of the pixel electrodes at a predetermined cycle is adopted.

However, when the 1H inversion driving method or the line inversion driving method is adopted, an electric field (hereinafter referred as a horizontal electric field) is generated between adjacent pixel electrodes to each other on the same substrate in a column direction or a row direction where voltages with different polarities are applied. When the horizontal electric field is generated between the adjacent pixel electrodes, the direction of the liquid crystal molecules is affected by the horizontal electric field to disorder the alignment of the liquid crystal.

In particular, in the homeotropic alignment where it is difficult to control the arrangement of the liquid crystal molecules when voltage is not applied and the rotation of the liquid crystal molecules when the voltage is applied, the liquid crystal molecules are significantly affected by the horizontal electric field to easily disorder the alignment. Therefore, in the liquid crystal device using the homeotropic alignment, a method in which a step is provided in the liquid crystal layer in order to define the alignment of the liquid crystal molecules is adapted sometimes.

However, in a projection-type display device using the liquid crystal panel as a light valve, there are problems that the area of the substrate of the liquid crystal panel is small, and an aperture ratio is significantly lowered when the step is provided.

Therefore, as the liquid crystal device using the homeotropic alignment where it is difficult to define the alignment direction of the liquid crystal molecules, one which employs circular polarized light as transmission light has been developed. The circular polarized light is an isotropic polarization in which does not have deflection in a polarization direction, and thus can achieve a high contrast image without damaging brightness. Japanese Unexamined Patent Application Publication No. 2002-40428 describes about the circular polarized light.

SUMMARY OF THE INVENTION

However, a circular polarizer has a polarizing characteristic with a wavelength dependency. Therefore, in a liquid crystal device where the homeotropic alignment and the circular polarized light are combined with each other, there is a problem that a perfect black level display that is a characteristic of the homeotropic alignment cannot be always achieved depending on the wavelength of the incident light.

The present invention has been addressed to solve such problems, and therefore, an object of the present invention is to provide a liquid crystal device which is capable of obtaining a perfect black level even if a liquid crystal panel using circular polarized light is adopted as a light valve, and a projection-type display device using the same.

This invention provides a liquid crystal device, that can include a liquid crystal layer sealed between a pair of opposed substrates constituting a liquid crystal panel, a first polarizer that converts incident light into a circularly polarized component in one rotary direction to emit to the liquid crystal panel, the first polarizer facing the incidence surface of the liquid crystal panel and having a birefringence characteristic set based on the peak wavelength of the incident light, and a second polarizer for transmitting a circularly polarized component in another rotary direction of the light which passed through the liquid crystal panel, the second polarizer facing the exit surface of the liquid crystal panel and having a birefringence characteristic set based on the peak wavelength of the incident light.

According to such a structure, the light incident on the first polarizer is converted into the circularly polarized component in one rotary direction and is emitted to the liquid crystal panel. The liquid crystal panel rotates the incident light based on the image signal and emits the transmission light to the second polarizer. The second polarizer transmits only the circularly polarized component of the other rotary direction out of the light transmitted the liquid crystal panel. For example, in case where the liquid crystal panel transmits the incident light without rotating the incident light, the transmitted light is blocked by the second polarizer to thereby perform the black display. In this case, the first and second polarizers have their birefringence characteristics set based on the peak wavelength of the incident light in order to exhibit desired polarizing characteristics for the incident light. Therefore, in case where light with the same peak wavelength as that of the incident light is used as a light source, it is possible to surely perform the black display.

The birefringence characteristics of the first and second polarizers are set based on the peak wavelength of red light, green light, or blue light. According to such a structure, in case where the incident light is red light, green light, or blue light, it is possible to obtain a desired polarizing characteristic in the first and second polarizers and to thus surely perform the black display.

Further, the first and second polarizers each consist of a linear polarizers and a quarter-wavelength retardation plates. According to such a structure, it is possible to appropriately set the thickness of the retardation plate and to thus easily form the quarter-wavelength retardation plate.

In the first and second polarizers, four times the amount of phase shift of the quarter-wavelength retardation plate is almost equal to the peak wavelength of the incident light. According to such a structure, in case where light having almost the same peak wavelength as that of the incident light is used as a light source, it is possible to obtain the desired polarizing characteristic by polarizers formed by the linear polarizer and the quarter-wavelength retardation plate and to thus surely perform the black display.

The first and second polarizers are each formed of a liquid crystal layer having cholesteric liquid crystal. According to such a structure, cholesteric liquid crystal that forms the first polarizer converts the incident light into the circularly polarized component in one rotary direction. The cholesteric liquid crystal that forms the second polarizer transmits only the circularly polarized component of the other rotary direction in the incident light. Therefore, it is possible to obtain the desired polarizing characteristic.

The first and second polarizers control a cholesteric pitch to set the birefringence characteristic. According to such a structure, it is possible to surely obtain the desired birefringence characteristic by the first and second polarizers by controlling the cholesteric pitch.

The liquid crystal layer is formed of perpendicularly aligned liquid crystal. According to such a structure, it is possible to surely perform the black display when voltage is not applied.

This invention provides a projection-type display device, including light valves of respective axes each having the same structure as the above liquid crystal device, an input optical system for supplying light-source light of a plurality of axes with different peak wavelengths to the light valves of the respective axes, and an output optical system for projecting output light of the light valves of the respective axes. According to such a structure, the light valves of the respective axes each formed by the liquid crystal device can obtain the desired polarizing characteristic because the first and second polarizers have the birefringence characteristic based on the peak wavelength of the incident light. Therefore, it is possible to surely perform the black display.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
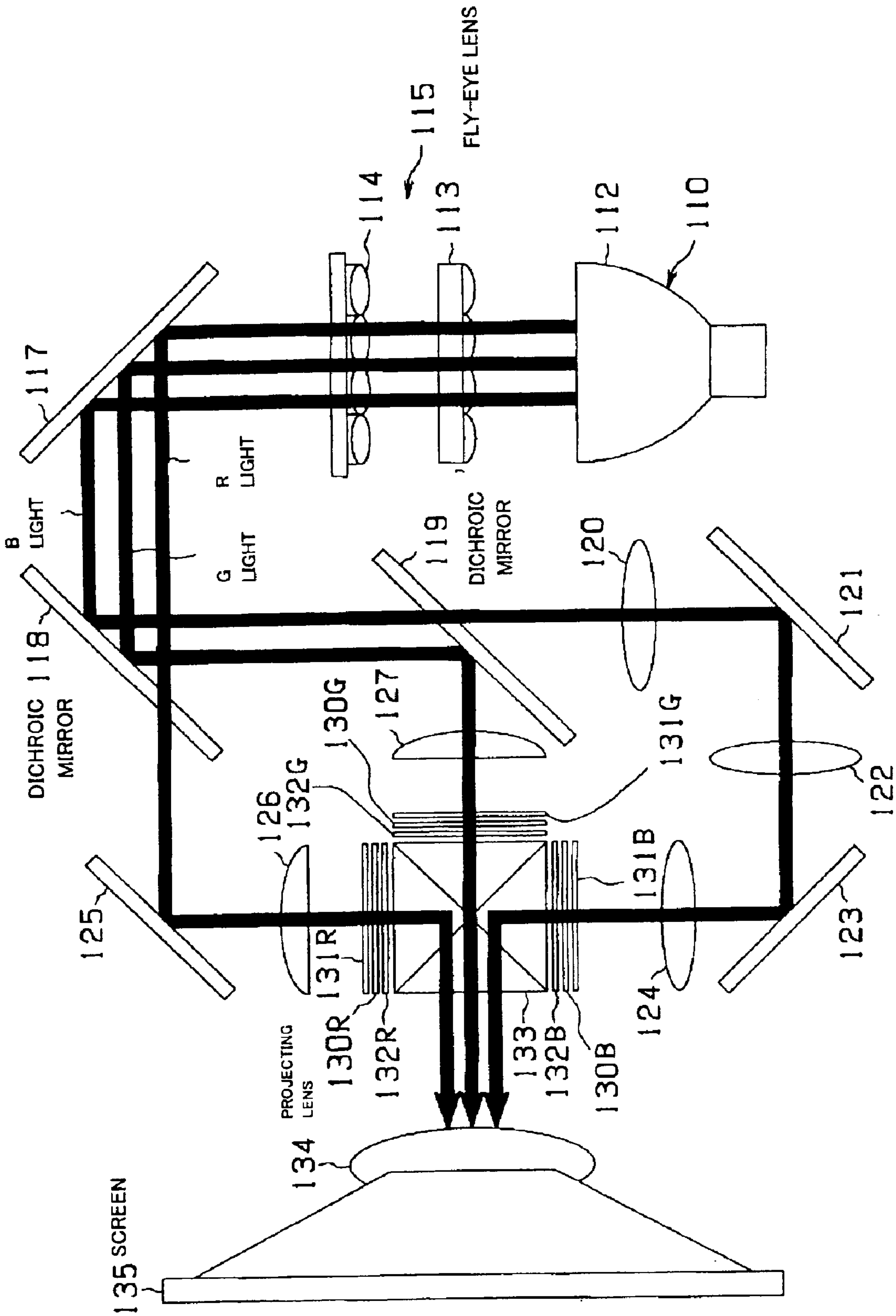
FIG. 1 is a view illustrating the schematic structure of an optical system of a projection-type display device according to a first embodiment of the present invention.
Figure 2:
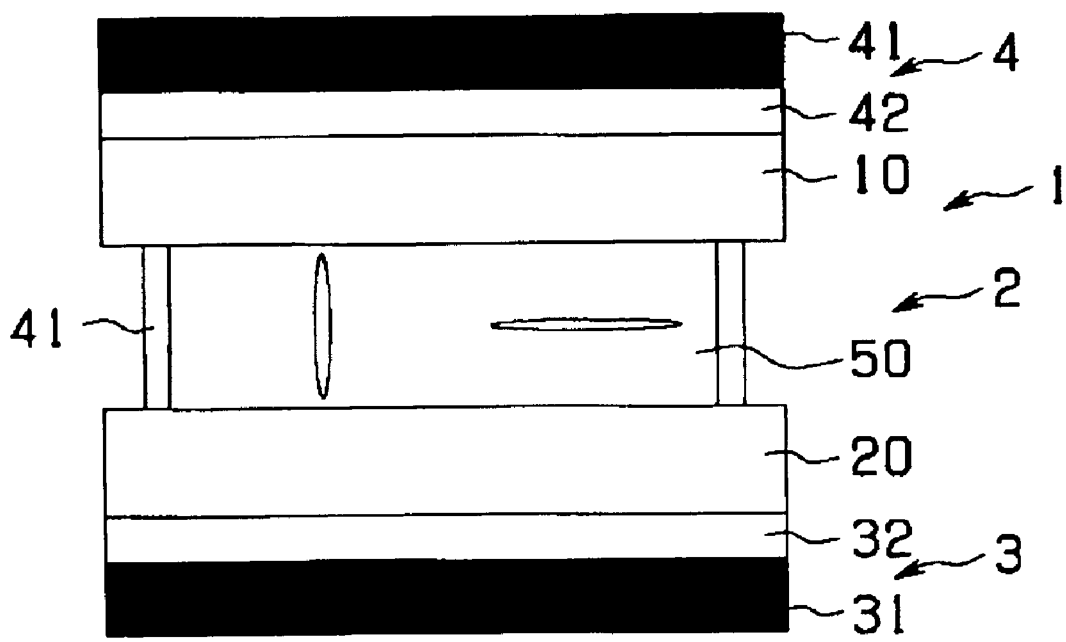
FIG. 2 is a view illustrating the sectional structure of a liquid crystal device used in the projection-type display device.

Embodiments of the present invention will now be described in detail with reference to the drawings. FIG. 1 is a view illustrating a schematic structure of an optical system of a projection-type display device according to a first embodiment of the present invention. FIG. 2 is a view illustrating the sectional structure of the liquid crystal device used for the projection-type display device of FIG. 1. FIG.

3 is an equivalent circuit diagram illustrating various elements and wiring lines in a plurality of pixels that form a pixel region of the liquid crystal device of FIG. 2. Note that, in the drawings, the scales of the layers and the elements vary so that the layers and the elements are enlarged to be recognizable.

According to the present embodiment, a liquid crystal device in which a homeotropic alignment is combined with circular polarization is used for a three-plate projection-type display device, and the characteristics of a polarizer that forms the liquid crystal device are made the same as the wavelength characteristics of the light-source lights of the respective axes to perform a perfect black level display and thereby to improve image quality.

The first, the structure of the liquid crystal device will now be described with reference to FIGS. 2 and 3. A liquid crystal device 1 is formed by attaching polarizers 3 and 4 to the incidence plane and the emission plane of a liquid crystal panel 2, respectively. The liquid crystal panel 2 is formed by sealing liquid crystal between an element substrate 10, such as a TFT substrate and a counter substrate 20. Pixel electrodes that form pixels are arranged in a matrix on the element substrate 10. FIG. 2 illustrates an equivalent circuit of elements which form pixels on the element substrate 10.

Figure 3:
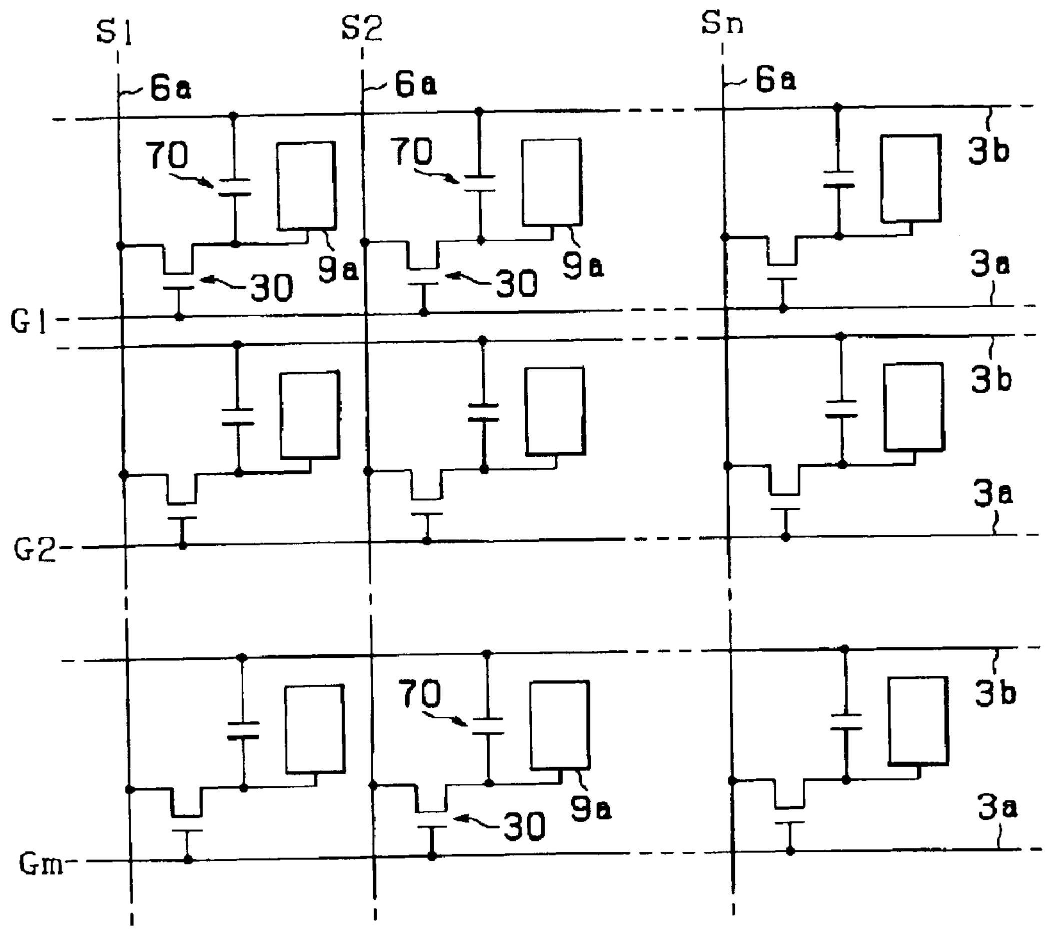
FIG. 3 is an equivalent circuit diagram of various elements and wiring lines in a plurality of pixels that form the pixel region of the liquid crystal device of FIG. 2.

As illustrated in FIG. 3, in a pixel region, a plurality of scanning lines 3*a* and a plurality of data lines 6*a* are wired such that the scanning lines 3*a* intersect the data lines 6*a*. Pixel electrodes 9*a* are arranged in a matrix in regions partitioned by the scanning lines 3*a* and the data lines 6*a*. TFTs 30 are provided at the intersections between the scanning lines 3*a* and the data lines 6*a*. The pixel electrodes 9*a* are connected to the TFTs 30.

The TFTs 30 are turned on by an ON signal of the scanning lines 3*a*. Therefore, the image signal supplied to the data lines 6*a* is supplied to the pixel electrodes 9*a*. A voltage between the pixel electrodes 9*a* and counter electrodes 21 provided on the counter substrate 20 is applied to a liquid crystal layer 50. Storage capacitors 70 are provided to be parallel to the pixel electrodes 9*a*. The voltage of each of the pixel electrodes 9*a* is held for a longer time by at least triple digits, for example, than the time while a source voltage is applied. Since a voltage holding characteristic is improved by the storage capacitors 70, it is possible to display an image with a high contrast ratio.

The liquid crystal panel 2 has a sealing material 41 for sealing the liquid crystal formed between the element substrate 10 and the counter substrate 20. The sealing material 41 is arranged to almost coincide with the shape of the outline of the counter substrate 20, and thereby to firmly fix the element substrate 10 to the counter substrate 20. The sealing material 41 is not formed in a part of one side of the element substrate. The part where no sealing material 41 is applied constitutes an opening through which the liquid crystal is injected into a gap between the element substrate 10 and the counter substrate 20 fixed to each other is formed in the missing portion. After the liquid crystal is injected through the liquid crystal filler opening, the opening is sealed by a sealing agent (not shown).

In the liquid crystal panel 2, perpendicularly aligned liquid crystal is used as the liquid crystal layer 50. The vertical ellipse in the liquid crystal layer 50 of FIG. 2 indicates the direction of the liquid crystal molecules when a voltage is not applied. The horizontal ellipse indicates the direction of the liquid crystal molecules when a voltage is applied. The liquid crystal layer 50 has a property to shift the phase of incident light up to $\pi$. In general, the amount of the phase shift of incident light by the liquid crystal layer depends on $\Delta n$ (anisotropy refractive index)×d (thickness of liquid crystal layer). Therefore, it is possible to form the liquid crystal layer with the amount of phase shift of $\pi$ by appropriately setting the thickness d of the liquid crystal layer 50.

No rubbing process of the substrates 10 and 20 is needed because the perpendicularly aligned liquid crystal is used as the liquid crystal layer 50. The rubbing process is an extremely important process among manufacturing processes. Therefore, it is possible to significantly improve productivity by omitting the rubbing process.

The polarizer 3 can include a linear polarizer 31 and a $\lambda/4$ retardation plate 32. The polarizer 4 consists of a linear polarizer 41 and a $\lambda/4$ retardation plate 42. The polarizer 3 is formed such that light enters from the linear polarizer 31 and exits from the $\lambda/4$ retardation plate 32 and the right circularly polarized component of the incident light is transmitted. The polarizer 4 is formed such that light enters from a $\lambda/4$ retardation plate 42 and exits from the linear polarizer 41 and only the left circularly polarized component of the incident light is emitted.

The $\lambda/4$ retardation plates 32 and 42 can be manufactured by extending, for example, polycarbonate to have a predetermined thickness. According to the present embodiment, as will be described in greater detail below, the amount of phase shift of the $\lambda/4$ retardation plates 32 and 42 is set in accordance with the peak wavelength of the incident light.

According to the present embodiment, the projection-type display device illustrated in FIG. 1 is formed using three of the liquid crystal device 1 having the above structure.

In FIG. 1, a metal halide lamp, a high-pressure mercury lamp or the like is used as a light source 110, and the light from light source 110 is reflected forward by a reflector 112. A fly-eye lens 115 and a reflecting mirror 117 are arranged on the optical path of the light emitted from the light source 110.

A fly-eye lens 115 can include a first lens array 113 and a second lens array 114. The first lens array 113 divides an incident light flux into a plurality of secondary light-source lights to emit. The second lens array 114 makes the secondary source light from the first lens array 113 repeatedly incident on the incidence surface of the liquid crystal panel in cooperation with the later-mentioned lenses. Therefore, the fly-eye lens 115 can irradiate the light from the light source 110 into the incidence surface of the liquid crystal panel with uniform brightness.

The reflecting mirror 117 can be arranged at the emission plane side of the fly-eye lens 115. The reflecting mirror 117 is provided inclined by about 45 degrees with respect to an optical axis and reflects the light emitted from the fly-eye lens 115. A dichroic mirror 118 and a reflecting mirror 125 are arranged on the optical path of the light emitted from the reflecting mirror 117 inclined by about 45 degrees with respect to the optical axis. The dichroic mirror 118 reflects blue light and green light and transmits red light.

The reflecting mirror 125 reflects the red light incident through the dichroic mirror 118. A field lens 126, a polarizer 131R for red, a liquid crystal panel 130R, and a polarizer 132R are arranged on the optical path of the light reflected from the reflecting mirror 125. The red light from the reflecting mirror 121 enters the field lens 126. The field lens 126 condenses the incident red light flux on the display surface of the liquid crystal panel 130R through the polarizer 131R.

A dichroic mirror 119, a condensing lens 120, and a reflecting mirror 121 are arranged on the optical path of the light reflected from the dichroic mirror 118 inclined by about 45 degrees with respect to the optical axis. The dichroic mirror 119 reflects the green light and transmits the blue light out of the blue light and the green light reflected from the dichroic mirror 118.

A field lens 127, a polarizer 131G for green, a liquid crystal panel 130G, and a polarizer 132G are arranged on the optical path of the light reflected from the dichroic mirror 119. The green light reflected from the dichroic mirror 119 enters the field lens 127. The field lens 127 focuses the incident green light flux on the display surface of the liquid crystal panel 130G through the polarizer 131G.

The reflecting mirror 121 reflects the blue light that passes through the dichroic mirror 119. A condensing lens 122 and a reflecting mirror 123 inclined by about 45 degrees with respect to an optical axis are arranged on the optical path of the light reflected from the reflecting mirror 121. The reflecting mirror 123 reflects the incident blue light. A condensing lens 124, a polarizer for blue 131B, a liquid crystal panel 130B, and a polarizer 132B are arranged on the optical path of the reflecting mirror 123. The blue light reflected from the reflecting mirror 123 enters the condensing lens 124. The condensing lens 124 focuses the incident blue light flux on the display surface of the liquid crystal panel 130B through the polarizer 131B.

The optical path of the blue light that reaches the condensing lens 124 is longer than the optical paths of the other two colors that reach the field lenses 126 and 127, respectively. Therefore, the illumination distribution of the blue light flux incident on the liquid crystal panel 130B is made almost the same as the illumination distribution of the beams of the other two colors incident on the liquid crystal panel 130R and 130G by an optical system that includes the condensing lens 120, the reflecting mirror 121, the condensing lens 122, and the reflecting mirror 123.

According to the present embodiment, the polarizer 131R, the liquid crystal panel 130R, and the polarizer 132R are arranged in the same manner as the liquid crystal device 1 of FIG. 1. Also, the polarizer 131G, the liquid crystal panel 130G, the polarizer 132G, the polarizer 131B, the liquid crystal panel 130B, and the polarizer 132B are arranged in the same manner the liquid crystal device 1 of FIG. 1.

Each of the polarizers 131R, 131G, and 131B transmits the right circularly polarized component of the incident light flux and makes the right circularly polarized component incident on the relevant liquid crystal panels 130R, 130G, and 130B. R, G, and B image signals are supplied to the liquid crystal panels 130R, 130G, and 130B, respectively. The liquid crystal panels 130R, 130G, and 130B emit the incident R, G, and B right circularly polarized components by varying their phases based on image signals. The lights emitted from the liquid crystal panels 130R, 130G, and 130B is emitted through the polarizers 132R, 132G, and 132B. The polarizers 132R, 132G, and 132B each transmit the left circularly polarized component of the relevant incident light. A cross prism 133 is arranged on the optical paths of the image lights emitted from the polarizers 132R, 132G, and 132B.

The red light enters the cross prism 133 in a transmittance rate in accordance with the image signal by the polarizer 131R, the liquid crystal panel 130R, and the polarizer 132R. The green light enters the cross prism 133 in the transmittance rate in accordance with the image signal by the polarizer 131G, the liquid crystal panel 130G, and the polarizer 132G. The blue light eenters the cross prism 133 in the transmittance rate in accordance with the image signal by the polarizer 131B, the liquid crystal panel 130B, and the polarizer 132B.

The cross prism 133 is constituted of four right-angle prisms attached thereto in which a dielectric multilayer film that reflects red light and a dielectric multiplayer film that reflects blue light are arranged to cross each other. The cross prism 133 synthesizes the three R, G, and B color lights by the dielectric multiplayer films to emit the image light of a color image.

A projecting lens 134 is arranged on the optical path of the light emitted from the cross prism 133. The projecting lens 134 extends and projects the incident synthesized image light to a screen 135.

Figure 4:
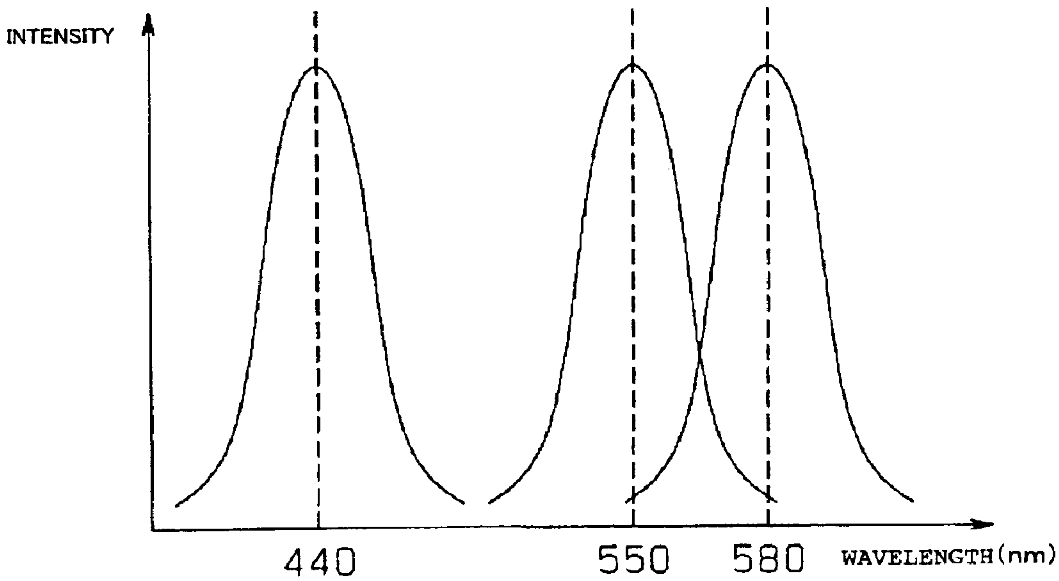
FIG. 4 is a graph illustrating the wavelength characteristic of each colored light.

According to the present embodiment, each of the polarizers 131R and 132R, the polarizers 131G and 132G, and the polarizers 131B and 132B has a wavelength characteristic that coincides with the wavelength characteristic of the incident light (light-source light) of each axis. FIG. 4 is a graph illustrating the wavelength characteristic of each color light. In FIG. 4, a curve with a peak wavelength of 440 nm illustrates the characteristic of blue light. A curve with a peak wavelength of 550 nm illustrates the characteristic of green light. A curve with a peak wavelength of 580 nm illustrates the characteristic of red light.

According to the present embodiment, the amount of phase shift $\lambda/4$ of the $\lambda/4$ retardation plate of the polarizers 131R and 132R is set as ¼ of the peak wavelength 580 nm of red light. The amount of phase shift $\lambda/4$ of the $\lambda/4$ retardation plate of the polarizers 131G and 132G is set as ¼ of the peak wavelength 550 nm of green light. The amount of phase shift $\lambda/4$ of the $\lambda/4$ retardation plate of the polarizers 131B and 132B is set as ¼ of the peak wavelength 440 nm of blue light. As mentioned above, the wavelength characteristics of the polarizers 131R and 132R, the polarizers 131G and 132G, and the polarizers 131B and 132B can be easily set by controlling the thickness of each $\lambda/4$ retardation plate.

Figure 5:
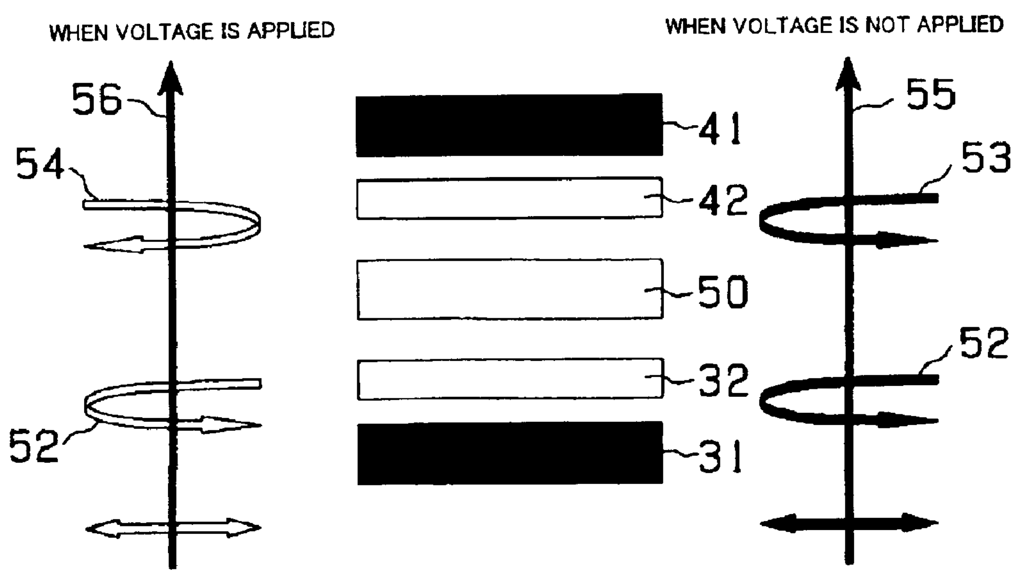
FIG. 5 is a view explaining the operation of the first embodiment.

The operation of the present embodiment having such a structure will now be described with reference to FIG. 5. FIG. 5 is a view explaining transmission of light in the present embodiment.

Light flux from the light source 110 enters the reflecting mirror 117 through the fly-eye lens 115. The fly-eye lens 115 irradiates the light on the incidence surface of the liquid crystal panel with uniform brightness. The light emitted from the fly-eye lens 115 is reflected by the reflecting mirror 117 and is split into red light, green light, and blue light by the dichroic mirrors 118 and 119. The red light from the dichroic mirror 118 is reflected by the reflecting mirror 125 and enters the polarizer 131R through the field lens 126. The green light reflected from the dichroic mirror 119 enters the polarizer 131G through the field lens 127. The blue light transmitted by the dichroic mirror 119 enters the polarizer 131B through the condensing lens 120, the reflecting mirror 121, the condensing lens 122, the reflecting mirror 123, and the condensing lens 124.

The polarizers 131R, 131G, and 131B transmit the right circularly polarized components of the incident red, green, and blue color lights to emit to the liquid crystal panels 130R, 130G, and 130B, respectively. The arrow 52 of FIG. 5 shows that the polarizers 131R, 131G, and 131B convert the incident light into the right circularly polarized component. Now, suppose that no voltage is applied to the liquid crystal panels 130R, 130G, and 130B. The arrow 53 of FIG. 5 illustrates the polarization direction of the light that passes through the liquid crystal layer 50, in this case. As illustrated by the arrow 53, in this case, the phase of the right circularly polarized component is not shifted in the liquid crystal layer 50.

The R, G, and B lights emitted from the liquid crystal panels 130R, 130G, and 130B enter the polarizers 132R, 132G, and 132B. The polarizers 132R, 132G, and 132B transmit only the left circularly polarized components of the incident lights. Therefore, when voltage is not applied, the light that passed through the liquid crystal layer 50 cannot pass through the polarizers 132R, 132G, and 132B. An arrow 55 of FIG. 5 illustrates the light that passes through the liquid crystal device when voltage is not applied. The arrow 55 illustrates that the transmission of the light is blocked by the polarizers 132R, 132G, and 132B.

On the other hand, when a voltage is applied, as illustrated by the arrow 54 of FIG. 5, the liquid crystal layer 50 shifts the phase of the incident light by π. That is, the liquid crystal layer 50 inverts the rotation direction of the right circularly polarized component to the left circularly polarized component and emits the left circularly polarized component. Therefore, as illustrated by the arrow 56 of FIG. 5, the light emitted from the liquid crystal layer 50 is emitted outside through the polarizers 132R, 132G, and 132B.

It is noted that the arrow 55 of FIG. 5 corresponds to a state where the liquid crystal molecules are perpendicularly aligned to the substrate, while the arrow 56 corresponds to a state where the liquid crystal molecules are horizontally aligned to the substrate. The liquid crystal molecules may not be perfectly horizontal with respect to the substrate depending on applied voltage (image signals). In this case, it turns out that the phase of the transmitted light is shifted in accordance with the tilt of the liquid crystal molecules. The liquid crystal layer converts the right circularly polarized component into elliptical polarization to emit the elliptical polarization. By doing so, image light is emitted from each of the liquid crystal devices of R, G, and B axes in a transmission ratio corresponding to an image signal.

According to the present embodiment, the wavelength of the λ/4 retardation plates 32 and 42 that form the polarizers 131R and 132R of the R axis, the polarizers 131G and 132G of the G axis, and the polarizers 131B and 132B of the B axis are set in accordance with the peak wavelengths of the incident R, G, and B lights. The following Table 1 illustrates the wavelength characteristics of the λ/4 retardation plates 32 and 42 of the respective axes.

TABLE 1

| | R | G | B |
|---|---|---|---|
| Light Source Peak Wavelength | 580 nm | 550 nm | 440 nm |
| λ/4 | 145 nm | 138 nm | 110 nm |

That is, the retardation plates 32 and 42 of the R axis are set such that the amount of phase shift is 145 nm. The retardation plates 32 and 42 of the G axis are set such that the amount of phase shift is 138 nm. The retardation plates 32 and 42 of the B axis are set such that the amount of phase shift is 110 nm. By doing so, the polarizers 131R, 131G, and 131B of the respective axes surely convert the respective incident lights into the right circularly polarized components. The polarizers 132R, 132G, and 132B of the respective axes surely transmit only the left circularly polarized component. Therefore, the polarizers 132R, 132G, and 132B surely block light and thereby perform an excellent black level display for the pixel to which no voltage is applied.

The R, G, and B image lights from the polarizers 132R, 132G, and 132B are synthesized by the cross prism 133 to be extended and projected to a screen 135.

Accordingly, in the present embodiment, each of the polarizers 131R and 132R, the polarizers 131G and 132G, and the polarizers 131B and 132B has the birefringence characteristic corresponding to the peak wavelength of the relevant incident light. This makes it possible to surely perform the black display and to thus improve an image quality.

The present embodiment has been described on the case that the liquid crystal of the homeotropic alignment is used as the liquid crystal layer. However, the horizontal aligned liquid crystal can be employed as the liquid crystal layer in the present embodiment. In this case, a liquid crystal panel in which the phase of transmitted light is shifted by π, that is, by λ/2 in the liquid crystal layer is adopted. Also, it is possible to surely transmit only the right circularly polarized component or the left circularly polarized component in accordance with the wavelength of the incident light by the polarizers on the incidence side and on the emission side. Therefore, it is possible to improve the reproducibility of an image.

Further, in fact, it is extremely difficult to set the amount of phase shift of the liquid crystal layer as π, so that the amount of phase shift for the λ/4 retardation plate is finely adjusted. It should be noted that as long as the wavelength of the λ/4 retardation plate is set within the half of the peak wavelength of the incident light of the respective axes, desired effects can be substantially achieved.

Figure 6:
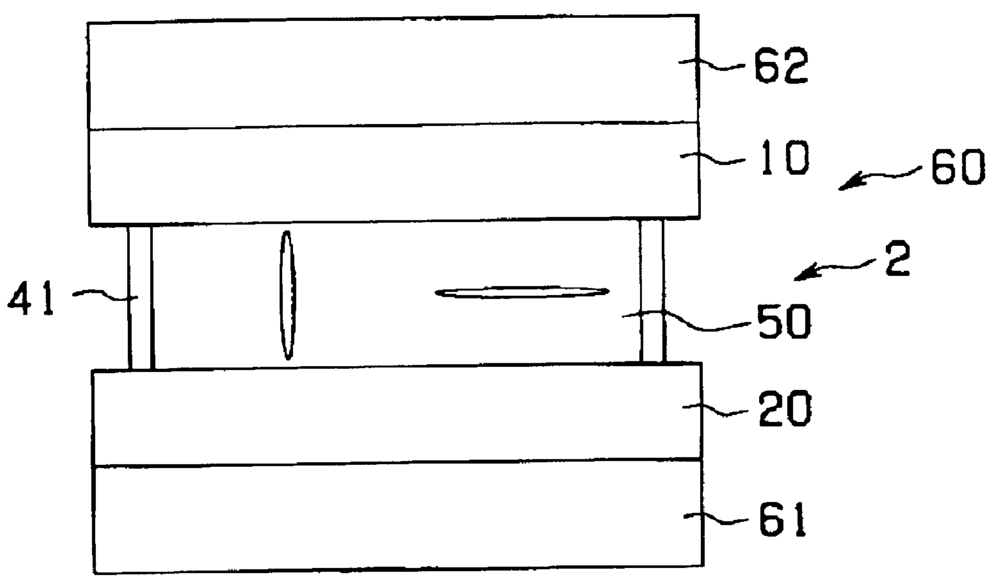
FIG. 6 is a view illustrating a second embodiment of the present invention.

FIG. 6 is a view illustrating a second embodiment of the present invention and shows a liquid crystal device with is used as a light valve of a projection-type display device of FIG. 1.

In the first embodiment, a polarizer includes a linear polarizer and a λ/4 retardation plate. According to the present embodiment, a liquid crystal layer using cholesteric liquid crystal is used as a polarizer. In FIG. 6, the same reference numerals represent the same elements as those of FIG. 2 and the description of the elements will be omitted.

The liquid crystal device according to the present embodiment is different from the liquid crystal device 1 of FIG. 2 in that polarizers 61 and 62 are used instead of the polarizers 3 and 4, respectively. The polarizers 61 and 62 are circular polarization elements formed of the cholesteric liquid crystal. The cholesteric liquid crystal has a reflected wavelength characteristic corresponding to a cholesteric pitch p. A relationship, λ (reflected wavelength characteristic)=n (average refractive index)×p is established.

The cholesteric liquid crystal has a liquid phase at a certain temperature (a liquid crystal transition temperature) or more. In the liquid phase, the liquid crystal molecules have a periodical spiral structure with a uniform pitch. It is possible to appropriately set the birefringence characteristics of the polarizers 61 and 62 using the cholesteric liquid crystal because the pitch of the spiral can be controlled by, for example, the intensity or the temperature of the UV rays by which the liquid crystal is hardened.

When a liquid crystal device 60 according to the present embodiment is applied to the liquid crystal device of FIG. 1, the wavelength characteristics of the light-source lights of the respective axes must be coincided with the birefringence characteristics of the polarizers 61 and 62. That is, when the liquid crystal device 60 is used for the R axis, the pitch p of the cholesteric liquid crystal that forms the polarizers 61 and 62 is set as 580/n nm. When the liquid crystal device 60 is used for the G axis, the cholesteric pitch p is set as 550/n nm. When the cholesteric pitch is used for the B axis, the cholesteric pitch p is set as 440/n nm.

By doing so, also in the present embodiment, the polarizer 61 surely emits the right circularly polarized component and the polarizer 62 surely transmits only the left circularly polarized component. Accordingly, it is also possible to obtain the same effects as those of the first embodiment in the present embodiment.

In the respective embodiments, the description has been given of the case that the liquid crystal device is applied to the projection-type display device, and only one retardation plate is used. However, it should be understood that it is possible to form the circular polarizer with two or more retardation plates. When the circular polarizer is used for a direct view type display device, in consideration of the dispersion of the wavelength of a film, the polarizer is set to have the retardation of λ/4 all over a visible wavelength band. To be specific, two retardation plates of λ/2 and λ/4 are used.

As described above, according to the present invention, it is possible to obtain a perfect black level display even if the liquid crystal panel using the circular polarization is used as the light valve.

What is claimed is:

1. A liquid crystal device, comprising:

a liquid crystal layer sealed between a pair of substrates of a liquid crystal panel including the pair of substrates arranged to face each other;

a first polarizer that converts incident light into a circularly polarized component in one rotary direction to emit to the liquid crystal panel, the first polarizer facing an incidence surface of the liquid crystal panel and having a birefringence characteristic that is set based on a peak wavelength of incident light, the first polarizer including a first linear polarizer and a first quarter-wavelength retardation plate, the first quarter-wavelength retardation plate having a phase shift amount, a product of four times the phase shift amount being substantially the same as the peak wavelength of the incident light; and a second polarizer that transmits a circularly polarized component in another rotary direction of the light which passed through the liquid crystal panel, the second polarizers facing an exit surface of the liquid crystal panel and having a birefringence characteristic based on a peak wavelength of the incident light, the second polarizer including a second linear polarizer and a second quarter-wavelength retardation plate, the second quarter-wavelength retardation plate having a phase shift amount, a product of four times the phase shift amount being substantially the same as the peak wavelength of the incident light.

2. The liquid crystal device according to claim 1, the birefringence characteristics of the first and second polarizers being set based on the peak wavelengths of only one of red light, green light, or blue light.

3. The liquid crystal device according to claim 1, the liquid crystal layer being formed of perpendicularly aligned liquid crystal.

4. A projection-type display device, comprising:

light valves of respective axes, each light valve having a same structure as the liquid crystal device according to claim 1;

an input optical system that supplies light-source light having a plurality of axes with different peak wavelengths to the light valves of the respective axes; and an output optical system that projects output light of the light valves of the respective axes.

5. A projector comprising:

an optical system that supplies a first light along a first optical path and a second light along a second optical path, the first optical light having a first optical axis and a first peak wavelength, the second light having a second optical axis and second peak wavelength, the first peak wavelength and the second peak wavelength being different from each other;

a first light valve disposed in the first optical path to receive the first light from the optical system, the first light valve including:

a first incident polarizer that converts the first light into a circularly polarized component in one rotary direction, the first incident polarizer including a first incident linear polarizer and a first incident quarter-wavelength retardation plate, the first incident quarter-wavelength retardation plate having a phase shift amount substantially equal to one quarter the first peak wavelength of the first light;

a liquid crystal panel that receives the circularly polarized component from the first incident polarizer, the liquid crystal panel including a pair of substrates with a liquid crystal layer sealed therebetween, the liquid crystal panel transmitting the received circularly polarized component to an exit side thereof; and a first exit polarizer disposed at the exit side of the liquid crystal panel and that transmits a component of light transmitted through the liquid crystal panel that is circularly polarized in another rotary direction that the one rotary direction, the first exit polarizer including a first exit line polarizer and a first exit quarter-wavelength retardation plate, the first exit quarter-wavelength retardation plate having a phase shift amount substantial equal to one quarter the first peak wavelength of the first light;

a second light valve disposed in the second optical path to receive the second light from the optical system, the second light valve including:

a second incident polarizer that converts the second light into a circularly polarized component in one rotary direction, the second incident polarizer including a second incident linear polarizer and a second incident quarter-wavelength retardation plate, the second incident quarter-wavelength retardation plate having a phase shift amount substantially equal to one quarter the peak wavelength of the second light;

a light crystal panel that receives the circularly polarized component from the second incident polarizer, the liquid crystal panel including a pair of substrates with a liquid crystal layer sealed therebetween, the light crystal panel transmitting the received circularly polarized component to an exit side thereof; and a second exit polarizer disposed at the exit side of the liquid crystal panel and that transmits a component of light transmitted through the liquid crystal liquid panel that is circularly polarized in another rotary direction than the one rotary direction, the second exit polarizer including a second exit linear polarizer and a second exit quarter-wavelength retardation plate, the second exit quarter-wavelength retardation plate having a phase shift amount substantially equal to one quarter the peak wavelength of the second light.

* * * * *